United States Patent [19]

Neigel

[11] 4,452,957

[45] Jun. 5, 1984

[54] PROCESS FOR THE PRODUCTION OF HOMO- AND CO-POLYMERS OF QUATERNARY AMMONIUM MONOMERS

[75] Inventor: Dennis Neigel, Whitehouse Station, N.J.

[73] Assignee: National Starch and Chemical Corporation, Bridgewater, N.J.

[21] Appl. No.: 407,015

[22] Filed: Aug. 11, 1982

[51] Int. Cl.³ .............................................. C08F 26/02
[52] U.S. Cl. ...................................... 526/71; 526/208; 526/210; 526/212; 526/213; 526/216; 526/239; 526/277; 526/287; 526/288; 526/291; 526/296; 526/310
[58] Field of Search ................. 526/71, 239, 277, 287, 526/288, 291, 296, 310, 208, 210, 212, 213, 216

[56] References Cited

U.S. PATENT DOCUMENTS

| | | | |
|---|---|---|---|
| 2,923,700 | 2/1960 | Price et al. | 526/287 |
| 2,923,701 | 2/1960 | Schuller et al. | 526/291 |
| 2,926,161 | 2/1960 | Butler et al. | 526/291 |
| 3,288,770 | 4/1966 | Butler | 526/296 |
| 3,412,019 | 11/1968 | Hoover et al. | 526/287 |

*Primary Examiner*—Harry Wong, Jr.
*Attorney, Agent, or Firm*—Edwin Szala; Ellen T. Dec

[57] ABSTRACT

Homo- and copolymers of quaternary ammonium monomers are prepared directly in dry form by a process which comprises forming a solution of the monomer(s), solvent and a free-radical initiator and simultaneously polymerizing the monomers and drying the solution at a temperature above the boiling point of the solvent.

10 Claims, No Drawings

PROCESS FOR THE PRODUCTION OF HOMO- AND CO-POLYMERS OF QUATERNARY AMMONIUM MONOMERS

BACKGROUND OF THE INVENTION

I. Field of the Invention

The present invention is directed to a process for the production of homo- and co-polymers of quaternary ammonium monomers in dry form by forming a concentrated solution of the monomer or respective monomers, initiators and any other reactants and simultaneously polymerizing the monomers and drying the solution.

II. Brief Description of the Prior Art

The most generally employed methods for producing homo- and copolymers of quaternary ammonium monomers, particularly quaternized diallyl amines such as dimetyldiallylammonium chloride (DMDAAC), yield a final product in the form of a solution or oil-in-water latex. In order to obtain a dry solid, it is then necessary to separate and dry or otherwise isolate the desired fraction. Typical of such methods are those described in U.S. Pat. Nos. 2,923,701; 3,284,393; 3,288,770; 3,461,163 and 3,920,599.

SUMMARY OF THE INVENTION

In accordance with the present invention, homo- and copolymers of quaternary ammonium monomers are prepared directly in dry form by a process which comprises forming a solution of the monomer(s), solvent and a free-radical initiator and simultaneously polymerizing the monomers and drying the solution at a temperature above the boiling point of the solvent.

By utilizing this process, a number of benefits are achieved. Thus, the direct conversion from monomer to dry polymer solids avoids the need for the plurality of steps required by prior art techniques. Moreover, by using the heat of polymerization to effect drying, a more energy conserving process is provided. Finally this process avoids the possibility of dangerous exotherms which may occur in a conventional solution polymerization so there is no need to control the heat of polymerization through heat transfer to a jacket or the like.

DETAILED DESCRIPTION OF THE PREFERRED EMBODIMENTS

The preferred quaternary ammonium monomers which are to be homo- or co- polymerized in accordance with the teachings of the present invention are represented by the following formula:

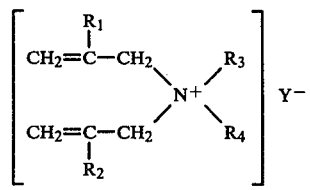

where $R_1$ and $R_2$ each represent a member of the class consisting of hydrogen and methyl and ethyl radicals; $R_3$ and $R_4$ each represent a member of the class consisting of alkyl, aryl, cycloalkyl, hydroxyalkyl and alkoxyalkyl radicals having from 1 to 18 carbon atoms; and $Y-$ represents an anion.

Illustrative examples of radicals represented by $R_3$ and $R_4$ are methyl to octadecyl alkyl radicals, inclusive; and methoxymethyl and the various higher alkoxy (e.g. methoxy to octadecoxy, inclusive) alkyls, e.g. ethyl ot octadecyl, inclusive; the corresponding hydroxyalkyl, cycloalkyl radicals etc. Illustrative examples of anions represented by Y are the halide ions, sulfate, sulfonate, phosphate, hydroxide, borate, cyanide, carbonate, thiocyanate, thiosulfate, isocyanate, sulfide, cyanate, acetate and the other common inorganic and organic ions.

Specific examples of monomers useful herein are the diallyl, dimethyldiallyl, dimethallyl and diethallyl dimethyl, di-(beta-hydroxy-ethyl) ammonium chlorides, bromides, phosphates and sulfates.

In producing copolymers of the quaternized ammonium monomers, any monomeric entities which are substantially non-volatile at the reaction temperatures and which contain a single $CH_2+C<$ grouping and which are typically reactive with the quaternized ammonium monomers may be used. Preferably, the monomers are of the general formula:

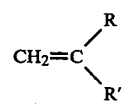

where R represents a member of the class consisting of hydrogen, halogen and alkyl, cycloalkyl, aryl, alkaryl and aralkyl radicals and R' represents a radical of the class consisting of aryl and alkaryl radicals and radicals represented by the formulas:

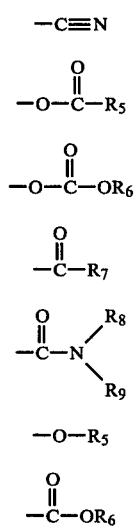

where $R_5$ and $R_6$ each represent a radical selected from the class consisting of alkyl, cycloalkyl, and alkoxyalkyl radicals or hydrogen or alkali metal cations, $R_7$ has the same meaning as $R_5$ and $R_6$ and, in addition, an aryl radical; and $R_8$ and $R_9$ each represents a member of the class consisting of hydrogen and alkyl, cycloalkyl, aryl, alkaryl, aralkyl and alkoxyalkyl radicals.

Preferable compounds represented by the above formulas and useful as monomers herein include styrene, aromatic substituted monomethyl and dimethyl styrene, methyl and other lower alkyl acrylates, acrylic acid, acrylamide, acrylonitrile, methacrylonitrile, vinyl acetate and the like.

If a copolymer is to be produced using the process of the invention, the quaternary ammonium monomer should be present in an amount of at least about 50%, preferably, at least about 75% by weight.

Generally, an aqueous media is used as the polymerization vehicle for the reaction although solvents, particularly those $C_{1-8}$ carbon compounds containing hydroxyl, ketone, aldehyde, ester or halide substitution, may be used. While the use of such solvents does pose some safety problems in processing, in some cases they provide advantages over the use of water which may make them more desirable. Thus, the manufacture of low molecular weight polymers may be accomplished by using a solvent with a greater transfer constant than water. This would eliminate the need for aqueous chain transfer agents coupled with larger amounts of catalyst used to make comparable molecular weight compounds in water. Another advantage to the use of non-aqueous solvents is that the particular monomers to be polymerized may have a greater solubility in the solvent than they would have in water. In such cases, higher concentrations of reactants could be employed and greater through-put realized. The latter approach would be especially useful for reactants which form high viscosity solutions at low concentrations in water.

Whether water or other solvents (both hereinafter referred to as "solvents") are used, the reactants should be uniformly dispersed throughout the media in solute or emulsion form, using dispersants or emulsifiers if necessary. Sufficient solvent should be used to homogeneously dissolve or disperse the components throughout the reaction system in order to facilitiate the polymerization rate and provide a uniform end product. Amounts of solvent in the range of about 10 to about 90% by weight of the reaction mixture will generally be used. The amount of solvents used will depend, in part, upon the particular drying method employed. Thus, extrusion and calendering processes are usually operated at higher solids levels, e.g. about 70 to 90% dry solids, while spray drying and flash drying are usually carried out at 10 to 40% dry solids. Drum drying, the preferred polymerization and drying method, is generally carried out at levels of 30 to 85%, preferably 40 to 65%, solids.

The reaction is carried out using conventional free radical polymerization techniques, most commonly in the presence of a free-radical initiator or free-radical precursor. Initiators which are useful in the embodiment wherein water or aqueous alcoholic solutions are used as solvent include the water-soluble peroxy catalysts, preferably a water-soluble salt of persulfuric (perdisulfuric) acid, which salt is preferably used in combination with a sulfoxy type of reducing agent. When such redox initiation systems are used, the reducing agent is incorporated into the feed solution in amounts of about 20–200% by weight, based on the weight of the initiator. Other examples of polymerization initiators which are useful include the inorganic and organic peroxides, e.g. the diacyl peroxides, the primary, secondary and tertiary alkyl peroxides and hydroperoxides and esters thereof, the various water-soluble peracetates, perchlorates, percarbonates, perborates, perphosphates, e.g. the ammonium and alkali-metal salts of peracetic, percarbonic, perboric, perphosphoric, persulfuric, perchloric, etc., acids; and water soluble ferric salts capable of yielding ferric ions, e.g. ferric ammonium sulfate, ferric sodium sulfate, etc. In a preferred embodiment, where polymerization and drying take place on a drum drier, cast iron drums may be used and the residual free ferric ions present thereon will provide the necessary initiating activity.

Such water-soluble initiators as mentioned above by way of example are generally employed in combination with a water-soluble activator, for instance, oxygen-containing, sulfur-containing compounds that are capable of undergoing oxidation. Illustrative examples of such activators or adjuvants include sulfur dioxide, the alkali-metal (e.g. sodium, potassium, etc.) bisulfites, hydrosulfites, thiosulfates, sulfurous acid ( or compounds which engender sulfurous acid, e.g. alkali-metal sulfites, ethyl and other alkyl sulfite, etc.), various organic sulfinic acid, e.g. p-toluene sulfinic acid, formamideine sulfinic acid, etc. If alkali-metal sulfites, e.g. sodium sulfite or similar compounds which engender sulfurous acid are used, the aqueous solution also should contain a strong acid, e.g. sulfuric acid, etc. in an amount which is at least chemically equivalent to the amount of such a compound engendering sulfurous acid that is employed.

The actual initiator concentration necessary to effect polymerization under the process drying conditions depends upon the reaction temperature, the reaction time and the free-radical initiating temperature of the initiator. Accordingly, the initiator level may vary considerably (e.g. from about 0.1 to about 10% of the monomer weight). Peroxide initiator concentrations are typically greater (e.g. 1–10%) than persulfate initiated systems (e.g. 0.03–3%). In the preferred embodiment wherein drum drying is employed, the persulfate concentration will generally fall within the range of 0.03 to 2.0% by weight monomer and preferably between about 0.05 to about 1.5% with a persulfate concentration ranging from about 0.1 to about 1.2% being most preferred.

It will be recognized that in cases wherein non-aqueous solvents are employed, it will be necessary that the initiator and activator chosen be soluble in the particular solvent. Suitable initiators and activators useful in this embodiment are well known to those skilled in the art.

It may also be desirable in practicing the present invention to add a buffer to the feed formulation to effectively control the pH of the final product. Although this is especially desirable in facilitating the production of a dry product having a neutral pH so as to prevent attack on the processing equipment by an acid generated during decomposition of the initiator, products of other pH values may also be prepared. These ends could not be accomplished by merely raising the initial pH of the feed with strong caustic since the quaternary amines decompose above pH 10. The particular buffer chosen can be a salt of any polyprotic weak acid, either organic or inorganic in nature. Typical examples of such buffers are salts of carbonic, phosphoric, succinic and phthalic acids. The buffer selected should be compatible with the particular feed formulation and should be used in sufficient concentration to render a neutral pH to the dry product. The amount of buffer needed will vary depending upon the type of buffer used, the type of initiator used and the desired pH of the dry product. Typical concentrations necessary to produce the neutral pH product are in the order of 20 to 200% of the concentration of the initiator, preferably 50 to 100%.

Alternatively, premature polymerization (e.g. without concomitant drying) can be effectively avoided by controlling the stage at which the polymerization initiator is introduced into the aqueous dispersion. In processes which, prior to drying, rely upon relatively high temperatures (e.g. greater than 60° C.) for several seconds or more to achieve homogeneous reactant dispersal, initiator addition may be delayed until immediately before or concurrently with the drying step. Conversely, in those processes wherein homogeneous dispersal can be effectively accomplished without exposing the reactants to polymerization conditions before drying, the polymerization catalyst system can be appropriately selected to generate free-radicals when the reactants are exposed to the elevated temperature of the drying step. In general, processes which rely upon relatively high temperature (e.g. greater than 70° C.) at a high solids levels (e.g. less than 40% water) are most suitably conducted under the delayed initiator incorporation techniques whereas the low temperature (e.g. less than 50° C.) and low solids processes (e.g. more than 50% water) are most suitable conducted in the presence of a thermally initiated polymerization catalyst system.

The reactants are simultaneously polymerized and dried to yield the resultant solid homo- or copolymer. Illustrative processes for simultaneously polymerizing and drying include extrusion, heat-exchanging, votating, calendering, spray-drying, flash-drying and drum-drying. The polymerization rate will depend upon the reactivity of the monomer(s) reactant concentration, the efficacy of the catalyst system, the reaction temperature and the polymerization time. THe most appropriate thermal conditions depend upon the boiling point of the solvent and also upon the particular apparatus used to simultaneously dry and polymerize the monomers in the homogeneous dispersion or solution. Usually the simultaneous drying and polymerization temperature will range between 60°-250° C. preferably being accomplished at less than 200° C.

Drum drying processes employing double drums and capable of drying and polymerizating the reactants within about 1 minute to 15 minutes time intervals at reaction temperatures ranging from about 60° to 170° C. are preferred depending upon the boiling point of the solvent. The temperature and reaction time is appropriately maintained so as to provide the desired final homo- or copolymer. The polymerization and drying conditions are effectively controlled by the operational drum speed, the amount of solution retained at any time in the reservoir formed at the nip between the drums and the drum temperature. Most effective manufacture and improved product functionality is accomplished by dissolving the reactants in water and maintaining the solution in the reservoir for a period of 5-15 minutes. The surface temperature of the drum-drier should range from about 120° to about 160° C. Excessive drum speed or excessively low temperatures may result in incomplete polymerization whereas excessively slow speeds at the more elevated temperatures can char the product and are uneconomical.

The homogeneous dispersion or solution application to the drier is at a rate sufficient to permit its drying and polymerization into the desired homo- or copolymer. Excessively thick films or non-uniform application can result in incomplete or non-uniform polymerization and drying of the product. Conversely, too thin of an application can result in product charring (especially at elevated temperatures) or inefficient production. In general, the drum drying processes typically provide a dried film of a thickness ranging from about 1 mil to about 50 mils with about 8 mil to about 10 mils being optimal.

The dried polymer will readily disperse into aqueous systems. If desired, polymers which are produced in sheet or film form may be ground to a suitable particle size as desired. Particles of size 30 mesh to 200 mesh (U.S.S.S.) have been found to be particularly useful in end use applications such as floccuating wherein these homo- and copolymers are conventionally employed.

The following examples are exemplary of the present invention.

EXAMPLE I

This example illustrates the production of dimethyldiallyl ammonium chloride homopolymer. A 24-inch wide (24-inch diameter) cast iron double roll drum drier was cleaned to remove surface rust and dirt. The drums were then pre-set with 60 psig steam pressure and rotated at 1.5 RPM. The gap was set at minimum and the blade at 20 psig.

Two mixtures, designated Mix 1 and Mix 2, were prepared using the components and amounts shown below.

| | Ingredient | Amt. (grams) |
|---|---|---|
| Mix 1 | Deionized water | 19 |
| | Ammonium persulfate | 1 |
| | Sodium carbonate | 0.35 |
| | Dimethyldiallyl ammonium chloride (63% in water) | 79.5 |
| Mix 2 | Deionized water | 19 |
| | Sodium thiosulfate | 1.3 |
| | Sodium carbonate | 0.35 |
| | Dimethyldiallyl ammonium chloride (63% in water) | 79.5 |

Both mixtures were dissolved in separate containers and purged of dissolved oxygen using a 15 minute subsurface nitrogen injection.

A feed mixture was then prepared using equal parts of mix 1 and mix 2 and the feed mixture fed into the nip between the rollers at a rate of 1 pound per minute so as to ensure a residence time of at least about 5 minutes in the resevoir. As the dried polymer formed on the drums, it was scraped off and the resulting sheet ground on a Cumberland Granulator using a 16 mesh screen.

Analysis of the polymer (with pH and Brookfield Viscosity measured at 40% solution in water) gave the following results:

| | |
|---|---|
| % Moisture (Cenco - 90 volts - 10 min.) | 4.3% |
| pH | 7.3 |
| Brookfield Viscosity @ 22° C. (Spindle #2 @ 20 RPM) | 260 cps |
| Intrinsic Viscosity @ 25° C. in 1 N KCl | 0.25 dl/gm |
| Conversion to polymer | 86.7% |
| Color (Gardner) | 5 |

EXAMPLE II

In a manner similar to that described in Example I using a 10 inch wide, 8 inch diameter drum a copolymer of dimethyldiallylammonium chloride and acrylamide was prepared.

|       | Ingredient | Amt. (grams) |
|-------|------------|--------------|
| Mix 1 | Dimethyldiallyl ammonium chloride (63% in water) | 159 |
|       | Acrylamide | 3 |
| Mix 2 | Deionized water | 44 |
|       | Ammonium persulfate | 1.7 |

Analysis of the polymer as in Example I gave the following results

| Ingredient | Amt. (grams) |
|------------|--------------|
| pH | 1.6 |
| Percent conversion | 92% |
| Viscosity | 2900 cps. |
| Intrinsic viscosity | 0.22 dl/gm |
| Color (Gardner) | 2 |

EXAMPLE III

The procedure of Example I was repeated using a 10 inch wide, 8 inch diameter drum to produce a copolymer of dimethyldiallyl ammonium chloride and acrylic acid.

Nine hundred five (905) grams of 63% solution of dimethyldiallyl ammonium chloride was combined with a solution of 30 grams acrylic acid in 270 grams deionized water. To the resultant solution 1.5 grams sodium persulfate and 2.1 grams sodium carbonate were added and the feed mixture fed between the drums of a double drum drier as described earlier.

Analysis of the resultant polymer as in Example I showed the following:

| Cenco Moisture | 10.2% |
|----------------|-------|
| Viscosity | 580 cps. |
| Percent Conversion | 91.3% |

EXAMPLE IV

The purpose of this Example is to demonstrate the effect of the monomer concentration on the percent conversion and the viscosity of the final product.

The procedure of Example I was duplicated using 8 inch diameter drum set at a steam pressure of 100 psig. Mixtures of varying monomer concentration were prepared as shown in the Table and combined for feeding between the drum. The amounts (grams) employed and the analysis of the corresponding products are shown in the Table below.

|          |          | A | B | C |
|----------|----------|---|---|---|
| Mix 1:   | Dimethyldiallyl ammonium chloride | 159 | 159 | 159 |
| Mix 2:   | Sodium Persulfate | 1.7 | 1.7 | 1.7 |
|          | Deionized water | 0 | 40 | 90 |
|          | Percent Solids | 63% | 50% | 40% |
| Analysis: | Solids | 50.0 | 50.1 | 49.3 |
|          | pH | 1.9 | 1.4 | 1.4 |
|          | Percent Conversion | 96.5% | 95.2% | 93.7% |
|          | Viscosity | 960 | 900 | 775 |

As can be seen from the above results, the percent conversion and viscosity of the final products are reduced as the solids concentration of the monomer in the feed mixture decreases.

EXAMPLE V

The purpose of this example is to show how the molecular weight of the resultant polymer may be increased by decreasing the level of catalyst in the feed mixture.

|          |          | A | B |
|----------|----------|---|---|
| Mix 1:   | Dimethyldiallyl ammonium chloride (63%) | 159 | 159 |
| Mix 2:   | Sodium Persulfate | 1.4 | 0.5 |
|          | Sodium carbonate | 1.4 | 0.4 |
|          | Deionized water | 40 | 40 |
| Analysis: | Solids | 41.5 | 41.8 |
|          | pH | 2.6 | 3.7 |
|          | Percent Conversion | 86% | 83.7% |
|          | Viscosity (cps) | 380 | 900 |

EXAMPLE VI

This example demonstrates the use of methanol/water as a solvent in the production of dry polymers according to the present invention.

A 10 inch wide, 8 inch diameter double stainless steel drum, set at 1.6 RPM and 80 psig steam was used with a 21 gm. per minute feed rate. The ingredients, amounts and analysis are shown in the table below.

A "Masterbatch" was prepared containing 1250 grams of a 63% aqueous solution of dimethyldiallyl ammonium chloride and 79 gms. of a 10% solution of sodium persulfate. This "masterbatch" was then used in the following formulations:

|                              | A | B | C | D |
|------------------------------|---|---|---|---|
| Masterbatch | 300 | 300 | 300 | 300 |
| Methanol | 0 | 30 | 60 | 90 |
| Deionized water | 90 | 60 | 30 | 0 |
| Percent solids | 46.1 | 46.1 | 46.1 | 46.1 |
| Percent methanol on monomer | 0 | 17 | 34 | 51 |
| Percent monomer in water | 45.6 | 45.6 | 45.6 | 45.6 |
| Analysis: |   |   |   |   |
| Cenco moisture | 2.0 | 2.2 | 2.4 | 1.8 |
| Percent solids | 40.4 | 40.5 | 40.8 | 41.4 |
| pH | 1.6 | 1.5 | 1.5 | 1.6 |
| Viscosity | 220 | 245 | 310 | 210 |
| Percent conversion | 84.1% | 83.8% | 87% | 84.5% |
| Color | 1 | 1 | 2 | 1 |
| Clarity (NTU) | 4.8 | 3.3 | 3.3 | 3.2 |

Now that the preferred embodiments of the present invention have been described in detail, various modifications and improvements thereon will become readily apparent to those skilled in the art. Accordingly, the spirit and scope of the present invention is to be limited only by the appended claims, and not by the foregoing disclosure.

I claim:

1. A process for the production of homo- and copolymers of a quaternary ammonium monomer in dry form comprising the steps of:
   (a) forming a solution of the monomer(s), solvent and free-radical initiator;
   (b) simultaneously polymerizing the monomer and drying the solution on a drum drier at a temperature above the boiling point of the solvent; and
   (c) recovering the resultaant dry polymer; wherein the monomer of (a) contains at least 50% by weight of the total monomer(s) of a quaternary ammonium monomer represented by the formula:

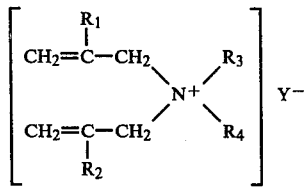

where $R_1$ and $R_2$ each represent a member selected from the group consisting of hydrogen and methyl and ethyl radicals; $R_3$ and $R_4$ each represent a member selected from the goup consisting of alkyl, aryl, cycloaklyl, hydroxyalkyl and alkoxyalkyl radicals having from 1 to 18 carbon atoms, and $Y^-$ represents an anion, and wherein the solvent of (a) is selected from the group consisting of water and $C_{1-8}$ carbon components containing hydroxyl, ketone, aldehyde, ester or halide substitution.

2. The process of claim 1 wherein the quaternary ammonium monomers are selected from the group consisting of the diallyl, dimethyldiallyl, dimethallyl and diethallyl dimethyl, di-(beta-hydroxyethyl) ammonium chloride or bromide.

3. The process of claim 2 wherein the quaternary ammonium monomer is dimethyldiallylammonium chloride.

4. The process of claim 1 wherein the quaternary ammonium monomers are selected from the group consisting of the diallyl, dimethyldiallyl, dimethallyl and diethallyl dimethyl, di-(beta-hydroxy-ethyl) ammonium phosphate or sulfate salts.

5. The process of claim 1 wherein the resultant product is a copolymer comprising up to about 50% by weight of a member selected from the group consisting of styrene, aromatically substituted mono-methyl and dimethyl styrene, methyl and lower alkyl acrylates, acrylic acid, acrylamide, methacrylonitrile, acrylonitrile and vinyl acetate.

6. The process of claim 1 wherein water is used as the solvent.

7. The process of claim 1 wherein methanol is used as the solvent.

8. The process of claim 1 wherein the simultaneous polymerizing and drying are carried out using a double drum drier at levels of 30 to 85% solids.

9. The process of claim 1 wherein there is additionally present in the solution a buffer in the amount of 20 to 200% by weight of the concentration of the initiator.

10. The process of claim 1 wherein the free radical initiator is a redox initiator system formed by additionally incorporating a reducing agent into the final solution in an amount of 20 to 200% by weight based on the weight of the initiator.

* * * * *